April 7, 1931. W. L. PATTERSON 1,799,639
COLORIMETER
Filed Jan. 30, 1926 2 Sheets-Sheet 2
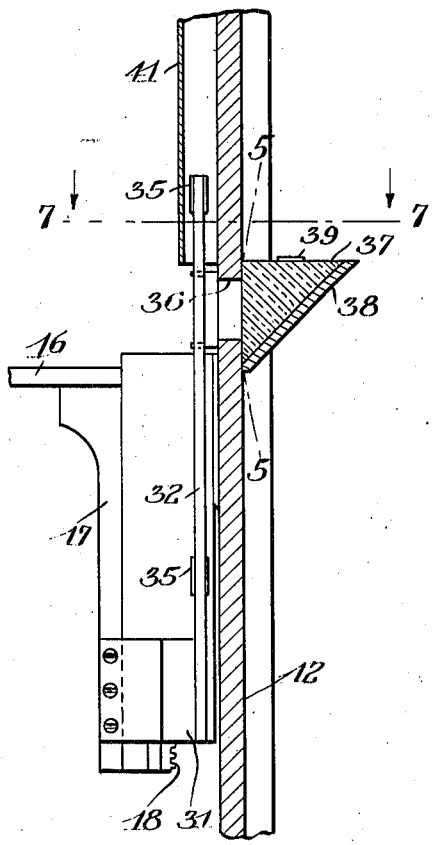
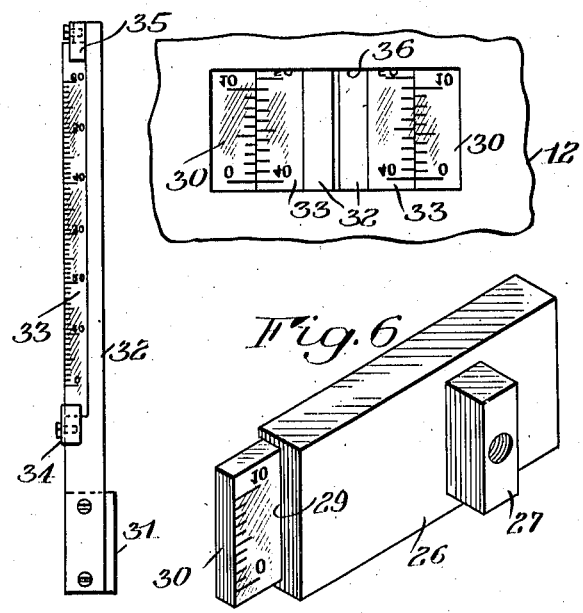
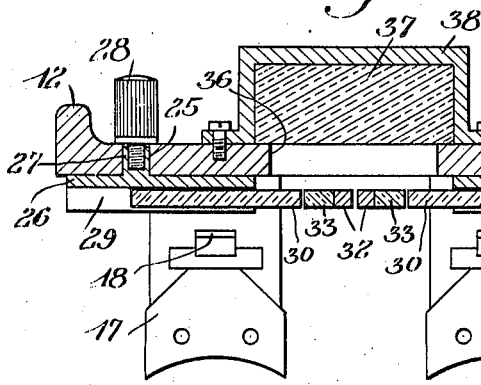
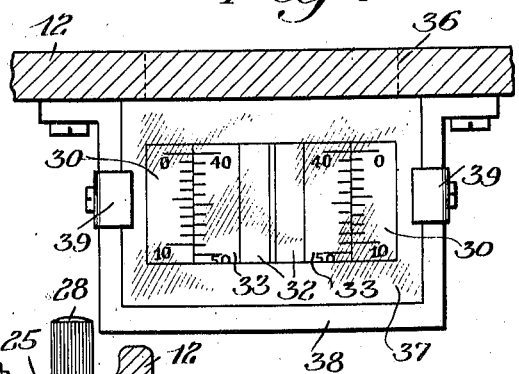
INVENTOR.
William L. Patterson
BY
his ATTORNEY Patented Apr. 7, 1931

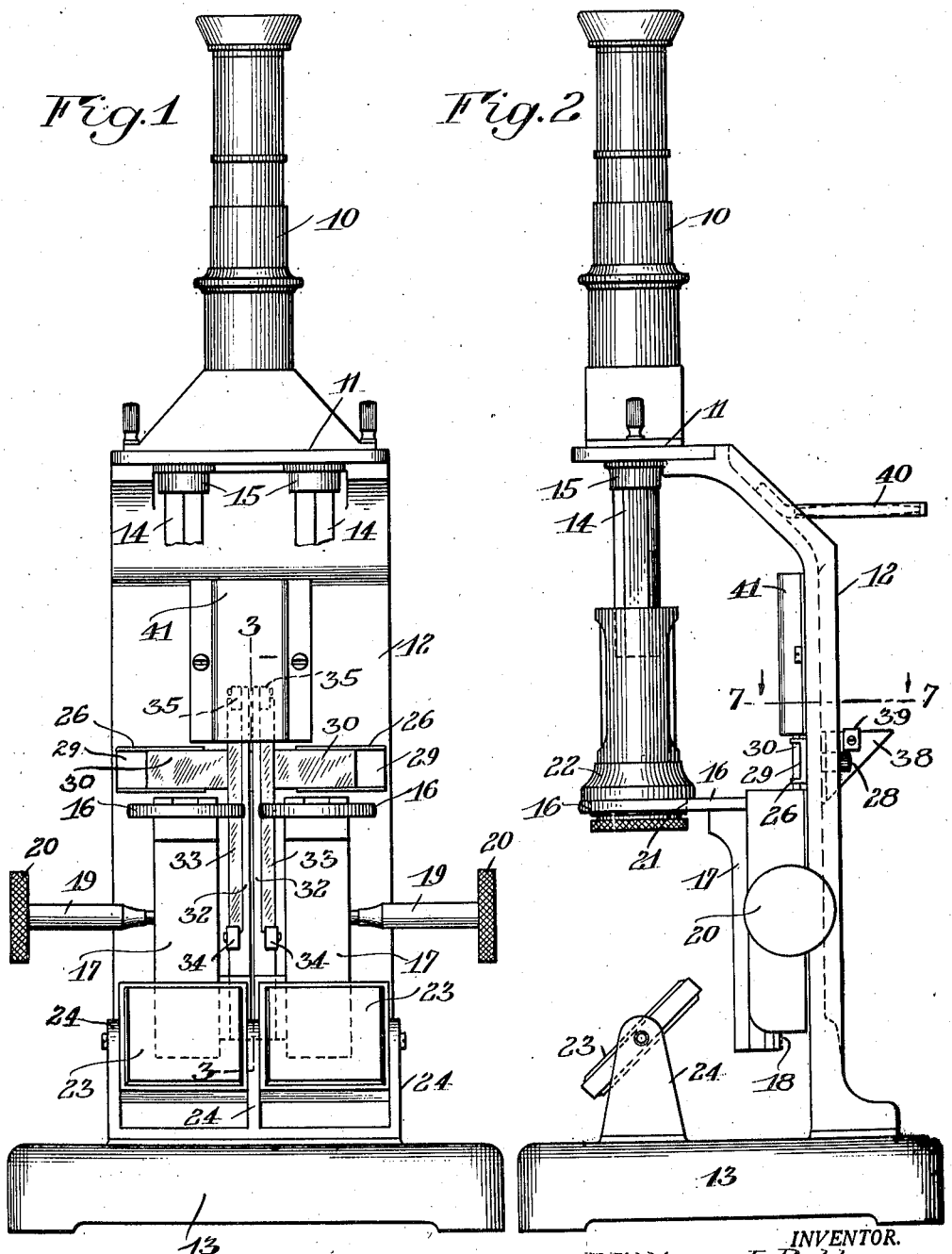

1,799,639

UNITED STATES PATENT OFFICE

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK

COLORIMETER

Application filed January 30, 1926. Serial No. 84,871.

This invention relates to precision instruments and particularly to the type known as colorimeters. With such devices for the comparison of colors of specimens, one of which is usually a standard, it is desirable to operate the instrument in a relatively dark room in order that the observer's eye will not be materially influenced or affected by light except from the specimens. Heretofore it has been necessary to either work in a light room or to illuminate the room when making a reading, and in the latter case it has been found that the flashing of a light in order to make a reading causes a contraction of the pupil of the eye of the observer, and therefore, in the succeeding observation, as when working in a light room, the pupil does not open sufficiently wide to permit of the most accurate comparison which the observer could make with the pupils wide open.

An object of this invention is to provide an improved instrument of this type and nature with which the making of readings will be facilitated; with which adjustments may be made to offset inaccuracies arising in the process of its manufacture; which will enable use of the instrument and observation of the indicating scales by the observer while in a relatively dark room and without the necessity of flashing a light or the use of an additional light for observation purposes; with which the reading observations may be made by the observer without moving his eyes materially from proximity to the optical observing system; and which will be relatively simple, convenient, and inexpensive.

Various other objects and advantages will be apparent from the following description of an embodiment of the invention, and the novel features will be particularly pointed out hereinafter in connection with the appended claims.

In the accompanying drawings:

Figure 1 is a front elevation of a colorimeter constructed in accordance with, and illustrating an embodiment of, the invention, the specimen holders being removed;

Figure 2 is a side elevation thereof, but with the specimen holders;

Figure 3 is a fragmentary enlarged vertical section of the same, with the section taken approximately along the line 3—3 of Figure 1;

Figure 4 is a rear elevation of one of the translucent scales, enlarged;

Figure 5 is a fragmentary sectional elevation showing a reading of the scales from the rear, the section being taken approximately along the line 5—5 of Fig. 3;

Figure 6 is a perspective of a support for a vernier scale;

Figure 7 is a sectional plan of a portion of the instrument, with the section taken approximately along the line 7—7 of Figures 2 and 3; and Figure 8 is a sectional plan of a portion of the instrument, with the section taken through the reflecting prism.

Similar reference numerals indicate the same parts throughout the several views.

In the illustrated embodiment of the invention, a suitable optical observing system 10 is mounted upon an overhanging portion 11 of an upright support or frame 12, the latter in turn being supported by a suitable base 13. An instrument of this general type is disclosed, for example, in my Patent Number 1,522,592, issued in my name January 13, 1925. From the overhanging portion 11, a pair of depth adjusting transparent members 14 are suspended. Such members may be transparent closed tubes, such as glass tubes, secured in rings 15 which are threaded into apertures in the overhanging portion and in line with the optical observing mechanism 10.

A pair of shelves 16 are provided upon the upper ends of two carriages 17 that are mounted upon the upright frame 12 in any suitable manner, so as to be adjustable vertically independently of one another along the frame 12.

Each carriage may have rack teeth 18 along its rear face, meshing with a pinion (not shown) provided upon an individual operating stem 19, which stem 19 is rotatably supported by the upright frame 12. Thus the stems 19 operate the carriages 17 vertically independently of one another, as usual in precision instruments. The stems 19 may be provided with operating buttons 20 to facilitate their rotation.

The shelves 16 which project from the carriages are provided with apertures 21 for receiving and supporting specimen cups 22, open at their upper ends and having closed transparent bottoms. These cups 22 also may have transparent side walls if desired. The cups are arranged directly below depth testing members 14, so that when the carriages are shifted vertically, the cups will move into telescopic relation with the depending members 14, that is, the members 14 will be received to various extents within the cups. Suitable reflecting means, such as tiltable mirrors 23, may be mounted in any suitable manner, such as between brackets 24 of the base 13. Such mirrors or reflecting devices are disposed beneath the cups 22 so as to reflect upwardly through the cups, light rays from a suitable source, as usual in such instruments.

The two cups 22 are preferably mounted upon separate carriages, as shown, in order that they may be independently adjusted. In the use of such an instrument, the unknown specimen is placed in one of the cups and the known specimen is placed in the other cup 22. Inasmuch as it is difficult to obtain a standard specimen which will retain its color through long period of time, or which will have a standard color for a particular standard thickness, it is desirable to have both cups independently adjustable, because if the standard specimen used has a particular color density when observed through a particular determined depth, the cup 22 containing it may be set for that particular depth, that is, with the member 14 depending therein a predetermined extent, which will then give a standard color comparison. The operator then adjusts the carriage of the other cup 22 vertically until the same color density is observed in both cups.

The optical system, in the particular form illustrated, includes a single observation tube which branches just above the receptacles 14, so that one may observe both specimens through a single optical system at one time. Such an optical system is more fully illustrated and described in the above mentioned patent and per se forms no part of the present invention. The frame 12, at a height approximately equal to the level of the cups 22 when the recetpacles 14 are received therein, is provided with vertically elongated slots 25 (see Fig. 8) in which vernier supports 26 are slidably supported. Each vernier support may have a rearwardly extending boss 27 which is received within an elongated slot 25, and a clamping button 28 having a reduced threaded stem is threaded into the rear face of each boss 27 so as to overlie the rear face of the upright frame 12. Thus the buttons 28 may be threaded into the vernier supports 26 to clamp them firmly to the frame 12, the supports 26 being adjustable vertically to a limited extent in the slots 25. Each vernier support may have a transversely extending groove 29 in which is mounted a diaphanous vernier scale element 30, which projects toward the other vernier scale upon the same face of the frame 12. Each vernier scale element 30 has vernier scale markings thereon, and may be secured to its support 26 in any suitable manner such as by cementing it in desired position in the groove 29.

The carriages are provided with brackets 31 which extend toward one another and support upright scale elements 32, (see Fig. 4). Each scale element 32 is provided along an edge thereof with a diaphanous insert 33 carrying a suitable scale, that is, having suitable scale indications marked or cut therein. Such diaphanous strips may be secured to the elements 32 in any suitable manner such as by clips 34 and 35 which are carried by the elements 32 and engage with the ends of the diaphanous scale. The diaphanous strips 33 carrying the scale indications are disposed upon the edges of their supporting elements 32 in such a manner as to run in close proximity edge to edge with the diaphanous vernier elements 30, as will appear in Figures 7 and 8. By reason of the grooves 29, the vernier scale elements 30 may be set closely to the strips 33, and thus facilitate the making of accurate readings. The scale indications upon both the vernier and its adjacent strip 33 read from abutting edges, and the readings of the verniers and scales moving with the carriages may be read from either face of the instrument.

Immediately behind the vernier supports 26, the frame is provided with a window or aperture 36 through which the vernier scale elements and adjacent sections of the scale strips 33 may be observed. Covering the window 36 however, is a reflecting prism 37 which may be secured in position in any suitable manner, such as by a frame 38 carried by the rear face of the frame 12 and having confining clips 39 overlying slightly the upper horizontal faces of the prism. Thus, one may, by looking into the upper face of the prism 37, observe both the diaphanous vernier elements 30 and the carriage scale strips 33. The frame 12 may also carry, adjacent its upper end, a magnifying lens 40 (see Fig. 2) for magnifying the image of the scale sections visible through the prism. A suitable shield 41 may be provided upon the forward face of the upright frame 12 and above the window 36, behind which shield the upper ends of the strips 32 may move when the carriages 17 are shifted upwardly.

In the use of such an instrument, the specimens to be compared are placed in the cups 22 and the latter set into the shelves 16 of the carriages. In order to compensate for errors in dimensions of parts, particularly in connection with errors in the thickness of the glass elements of the receptacles 14 and the transparent bottoms of cups 22, the carriages should first be adjusted upwardly until members 14 touch the bottoms of the cups. At this time the zero of each vernier scale should be opposite the zero scale indication of the adjacent strip 33 of the carriage. If they are not opposite one another the clamping buttons 28 may be loosened and the vernier supports adjusted vertically sufficiently to bring about such alignment, after which the buttons may be tightened to clamp the vernier supports in those positions.

The carriage 17 having the standard specimen is adjusted to the specified or desired comparison position. A source of light is directed by the mirrors 23 upwardly through the specimens, and the carriage mounting the unknown specimen is then adjusted vertically until the color appears to be the same in both specimens. Then by looking through the lens 40 into the reflecting prism 37, the observer can make a reading of the scales. By making the scales of diaphanous, that is, of light transmitting material, they will be illuminated by stray diffused light sufficiently to be readily visible and readable through the reflecting prism and the lens 40. The scale elements may be made of either translucent or transparent material and have the scale indications cut or otherwise marked thereon. The reading of the scale indicating the position of the carriage that carries the standard specimen will of course be observed in the same manner through the reflecting prism and the lens 40 and compared with the reading obtained for the carriage with the unknown specimen.

It will be observed that with such an instrument, the observer can make scale observations without material movement of his head from the observing position with relation to the optical system 10, and without the necessity of additional illumination or the flashing of a light for the purpose of reading the scales. This expedites the making of observations and comparisons, and is less trying upon the observer's eyes. The pupils of the observer's eyes are also not contracted during bright illumination of the room or the flashing of a light for scale reading purposes, and therefore the observer can make more accurate comparisons with such an instrument.

While the invention has been described in connection with this application to the comparison of colors, it will be understood that various features of the invention as set forth in the claims are equally applicable to other optical and precision instruments.

It will be obvious that various changes in the details, which have been herein described and illustrated in order to explain the nature of the invention, may be made by those skilled in the art within the principle and scope of the invention, as expressed in the appended claims.

I claim:

1. In a colorimeter, a support having an opening, an optical system carried thereby, a plurality of holders for test and standard specimens mounted on said support in position for examination by said optical system, said holders and system being relatively adjustable in order to effect a comparison of the specimens, means enabling illumination of said specimens for comparison, a diaphanous scale device associated with each of said holders opposite said opening for indicating the extents of said adjustments and positioned in the path of diffused light from said means to be illuminated thereby, to enable readings of said scale devices to be made in a relatively dark room.

2. In a colorimeter, a support having a window therein, an optical system carried thereby, a plurality of holders for test and standard specimens mounted on said support in position for examination by said optical system, said holders and system being relatively adjustable in order to effect a comparison of the specimens, means enabling illumination of said specimens for comparison, a scale device associated with said support on one side of the window for indicating the extents of said adjustments, and positioned for illumination by diffused light from said means, and optical means on the opposite side of the window including an eye-piece and a prism for reflecting the scale therein.

3. In a colorimeter, a support having an opening, an optical system carried thereby, a plurality of holders for test and standard specimens mounted on said support in position for examination by said optical system, said holders and system being relatively adjustable in order to effect a comparison of the specimens, means enabling illumination of said specimens for comparison in said optical system, and diaphanous scale means secured to said holders opposite said opening for indicating the extents of said comparative adjustments, said scale means being illuminated by stray diffused light resulting from the illumination of said specimens, and being readable from the rear by transmitted diffused light.

4. In a colorimeter, a support having an opening, an optical system carried thereby, a plurality of holders for test and standard specimens mounted on said support in position for examination by said optical system, said holders and system being relatively adjustable in order to effect a comparison of the specimens, means enabling illumination of said specimens for comparison in said optical system, diaphanous scale means secured to said holders and positioned opposite said opening for indicating the extents of said comparative adjustments, said scale means being illuminated by stray diffused light resulting from the illumination of said specimens, and being readable from the rear by transmitted diffused light, and optical means enabling observation of said scale means from a point in proximity to the optical system.

5. In a colorimeter, the combination of a frame having an opening therein, a carriage movably mounted on said frame, a specimen holder carried by said carriage, illuminating means for said specimen holder, and diaphanous scale means secured to said carriage, a portion of said scale means being opposite said opening and on the same side of said frame as said illuminating means and in the path of rays of diffused light from said illuminating means to be illuminated thereby.

6. In a colorimeter, the combination of a frame having an opening therein, a carriage movably mounted on said frame, a specimen holder carried by said carriage, illuminating means for said specimen holder, diaphanous scale means secured to said carriage, a portion of said scale means being opposite said opening and on the same side of said frame as said illuminating means and in the path of rays of diffused light from said illuminating means to be illuminated thereby, and reflecting means opposite said opening and on the opposite side of said frame from said scale means, for reflecting the readings of said scale upwardly.

7. In a colorimeter, the combination of a frame having an opening therein, carriages movably mounted on said frame, specimen cups mounted on said carriages, diaphanous scale means secured to said carriages, said scale means extending across said opening, means on one side of said frame for illuminating said specimen cups and said scale means and means on the other side of said frame for viewing said scale means.

8. In a colorimeter, the combination of a frame having an opening therein, a carriage adjustably mounted on said frame, a diaphanous scale having a front and a rear side, said scale being mounted on said carriage and positioned to move across said opening, means enabling illumination of the front side of said scale and reflecting means opposite said opening for viewing the rear side of said scale.

9. A colorimeter comprising a stand having an opening therein, cup carriages movably mounted on said stand, means for moving said carriages, diaphanous scales attached to said carriages for indicating the movements thereof, said scales being positioned to move past said opening, means on one side of said stand for illuminating said scales, reflecting means on the other side of said stand, said reflecting means being positioned opposite said opening and adapted to reflect an image of that part of said scale which is illuminated and positioned opposite said opening.

10. A colorimeter comprising a stand having an opening, a carriage movably mounted on said stand, a specimen cup mounted on said carriage, a scale secured to said carriage for indicating movements thereof, said scale being positioned opposite said opening, means positioned on one side of said support for illuminating said scale, reflecting means on the other side of said support, said reflecting means being positioned opposite said opening whereby an image of said scale is reflected by said reflecting means.

WILLIAM L. PATTERSON.